United States Patent [19]
Thornton

[11] 3,959,011  
[45] May 25, 1976

[54] BATTERY CASING

[75] Inventor: Roy F. Thornton, Schenectady, N.Y.

[73] Assignee: General Electric Company, Schenectady, N.Y.

[22] Filed: Oct. 4, 1974

[21] Appl. No.: 512,149

[52] U.S. Cl. .............................. 136/6 FS; 136/166
[51] Int. Cl.² .......................................... H01M 2/02
[58] Field of Search .................. 136/6 R, 6 F, 6 FS, 136/83 R

[56] References Cited
UNITED STATES PATENTS 3,826,685  7/1974  Dubin et al. ...................... 136/83 R
3,868,273  2/1975  Will et al. ......................... 136/83 R Primary Examiner—Donald L. Walton
Attorney, Agent, or Firm—Paul R. Webb, II; Joseph T. Cohen; Jerome C. Squillaro

[57] ABSTRACT

A battery casing is disclosed wherein two glass seals join together the metallic cap portion, the inner casing of a solid sodium beta-alumina ion-conductive material, and the outer metallic casing. Such a battery casing is useful in a sealed primary battery which employs a sodium type anode in one casing and a cathode such as a halogen or a halogen containing cathode in the other casing.

1 Claim, 1 Drawing Figure

U.S. Patent  May 25, 1976  3,959,011
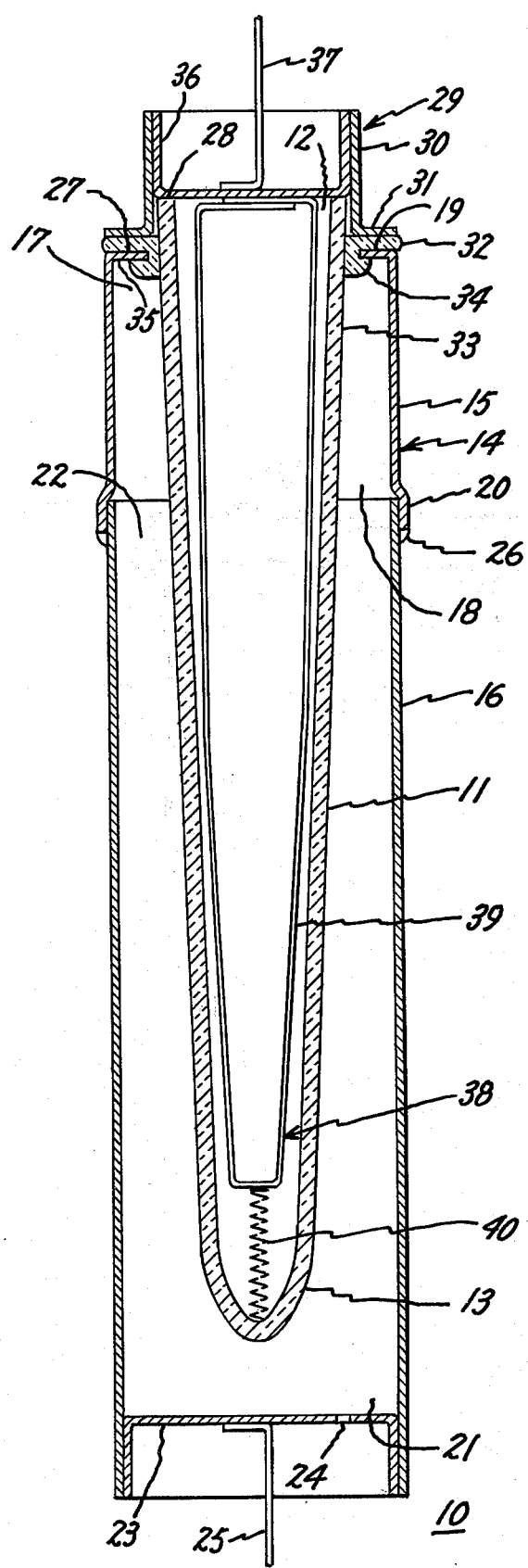

BATTERY CASING

This invention relates to improved battery casings and, more particularly, to such battery casings with a solid sodium beta-alumina ion-conductive electrolyte.

Sodium-sulfur cells, which operate at elevated temperatures, are known in the prior art as, for example, described in Kummer et al U.S. Pat. No. 3,404,036 issued Oct. 1, 1968 under the title "Energy Conversion Device Comprising a Solid Crystalline Electrolyte and a Solid Reaction Zone Separator". The solid crystalline ion-conductive electrolyte in the above-mentioned sodium sulfur battery can be sodium beta-alumina.

In U.S. Pat. No. 3,826,685 issued July 30, 1974 in the names of Robert R. Dubin et al and entitled "Wall Sealed Battery Casing and Sealed Primary Sodium-Halogen Battery", there is described and claimed a battery casing and a sealed primary sodium-halogen battery in which a sodium and halogen resistant glass seals together the adjacent flanges of the outer vessel portions and seals the outer vessel portions to the outer wall of the inner vessel.

In copending application Ser. No. 498,264, filed Aug. 19, 1974 entitled "Battery Casing and Sealed Primary Sodium-Halogen Battery" in the names of Fritz G. Will and Heinrich J. Hess, there is described and claimed a battery casing and a sealed primary sodium-halogen battery wherein the battery casing includes a glass sealing the outer casing to the inner casing.

In copending application Ser. No. 428,419, filed Dec. 26, 1973, entitled "Battery Casing and Sealed Primary Sodium-Halogen Battery" in the names of Fritz G. Will and Robert R. Dubin, and now U.S. Pat. No. 3,868,273, there is described and claimed a battery casing and a sealed primary sodium-halogen battery wherein the battery casing includes a single glass seal joining together the metallic anode cap, the inner casing of a solid sodium ion-conductive material, and the outer metallic casing.

The above U.S. Pat. Nos. 3,826,685 and 3,868,273 and application Ser. No. 498,264 are assigned to the same assignee as the present application.

In copending application Ser. No. 512,150, filed Oct. 4, 1974, entitled "A Hermetically Sealed Primary Battery" in the name of Roy F. Thornton, there is described and claimed such a battery which incorporates the battery casing of the present application. This copending patent application is assigned to the same assignee as the present application.

My present invention is directed to providing an improved battery casing over the above-identified patents and patent applications in that two glass seals join together the metallic cap portion, the inner casing of a solid sodium beta-alumina ion-conductive material, and the outer metallic casing resulting in a battery casing with strong seals and with the first seal protected by the second seal from corrosive action of the chemicals in the outer casing.

The primary object of my invention is to provide an improved battery casing.

In accordance with one aspect of my invention, a battery casing includes two glass seals which join together the metallic cap portion, the inner casing of a sodium beta-alumina ion-conductive material, and the outer metallic casing.

These and various other objects, features and advantages of the invention will be better understood from the following description taken in connection with the accompanying drawing in which:

The single FIGURE is a sectional view of a battery casing made in accordance with my invention.

In the single FIGURE of the drawing, there is shown generally at 10 a battery casing embodying my invention which has an inner casing of a solid sodium beta-alumina ion-conductive material 11 with an open end 12 and a closed end 13. An outer metallic casing 14 has an upper portion 15 and a lower portion 16. Upper portion 14 has initially opposite open ends 17 and 18. An inwardly extending flange 19 is affixed to upper portion 15 at its first open end 17 and a flare 20 at its second open end 18. Lower portion 16 has initially a first open end 21, a second open end 22, a removable closure 23 for its first open end 21 and an opening 24 in closure 23. An electrical lead 25 is shown welded to the exterior surface of closure 23. Upper and lower portions 15 and 16 are joined together as by welding at 26 at their associated second open ends 18 and 22. Outer metallic casing 14 surrounds inner casing 11 with exterior surface 27 of flange 19 on a lower plane than surface 28 at open end 12 of inner casing 11 and spaced from inner casing 11. A metallic closure 29 consisting of a cap portion 30 with a flange 31 and a cap insert has its flange 31 positioned adjacent to and spaced from flange 19. A first glass seal 32 seals together flange 19 of upper portion 15 of metallic casing 14 and flange 31 of cap portion 30 of metallic closure 29 and seals flanges 19 and 31 to a portion of outer wall 33 of inner casing 11, which portion of outer wall 33 is nearly round and is adjacent open end 12. A second glass seal 34 seals together opposite surface 35 of flange 19 of upper portion 15 of outer metallic casing 14, and a portion of outer wall 33 of the inner casing 11 thereby providing strong seals and protection of the first seal by the second seal from corrosive action of chemicals in the outer casing. Cap insert 36 with an electrical lead 37 welded to its exterior surface is shown positioned within cap portion 30 thereby closing open end 12 of inner casing 11. An electronic conductor 38 is affixed, as by welding, to interior surface of cap insert 36 thereby being positioned within interior surface of inner casing 11. Electronic conductor 38 is shown in the form of a closed wire hairpin 39 with a wire spiral 40 affixed to one end thereof whereby conductor 38 is in contact with closed end 13 of inner casing 11. The resulting structure is an improved battery casing embodying my invention.

The battery casing is formed by positioning an inner casing of a solid sodium ion-conductive material having an open end within an outer casing of a suitable, chemically stable material such as tantalum which comprises an upper portion and a lower portion, the upper portion with opposite open ends, an inwardly extending flange affixed to the upper portion at its first open end, the lower portion with opposite open ends, a removable closure for its first open end, and an opening in the removable closure. The subsequently complete outer metallic casing surrounds the inner casing with the exterior surface of the flange on a lower plane than the surface of the open end of the inner casing and spaced from the inner casing. A metallic closure, such as of tantalum, consists of a cap portion with a flange and a cap, has the flange of the cap portion positioned adjacent the flange of the upper portion of the outer metallic casing. Other suitable metals can be employed for the outer casing and the metallic closure provided the metal bonded to the glass has approximately the same expansion coefficient and chemical stability toward the material in the outer casing. Two glass washers are positioned, respectively, between the adjacent flanges and in contact with the exterior wall of the inner vessel, and against the opposite surface of the outer metallic casing flange, and a portion of the outer wall of the inner casing. Each glass washer is made of a suitable sodium and halogen resistant glass, such as Corning Glass No. 7052, General Electric Company Glass No. 1013, Sovirel Glass No. 747, or Kimble Glass No. N-51A. The glass washers and associated assembly are positioned in an inverted position held by a suitable jig and heated to a temperature in the range of 1175° to 1250°C in an argon atmosphere whereby one glass washer seals together the adjacent flanges of the upper portion of the outer metallic casing and the cap portion of the metallic closure and seals the flanges to the outer wall of the inner vessel adjacent its open end. The second glass washer seals together the opposite surface of the flange of the upper portion of the outer metallic casing and a portion of the outer wall of the inner casing. The upper and lower portions of the outer casing are then joined together at their second open ends, such as by welding to complete the outer casing. The cap insert is adapted to be positioned within the cap portion thereby closing the open end of the inner casing. The cap insert has an electronic conductor of a material such as tantalum or nickel affixed to its interior surface which is adapted to be positioned within the interior surface of the inner casing. The preferred form of the conductor is a closed wire hairpin with a wire spiral affixed to its opposite end whereby the spiral contacts the interior surface of the closed end of the inner casing when positioned within the inner casing. This structure results in a battery casing made in accordance with my invention.

EXAMPLE I

Fifty battery casings were assembled as above-described and as shown in the single FIGURE of the drawing. Each battery casing was formed by positioning an inner casing of a solid sodium ion-conductive material having an open end and a closed end within an outer metallic casing of a suitable, chemically stable material of tantalum which comprised an upper portion and a lower portion, the upper portion with opposite open ends, an inwardly extending flange affixed to the upper portion at its first open end and the lower portion with opposite open ends. A metallic closure of tantalum with a flange had its flange positioned adjacent the exterior surface of the flange of the upper portion of the outer casing with a glass washer therebetween. The associated flanges and glass washer were aligned inverted with a jig fixture so that the outer surface of the flange of the outer metallic casing was on a higher plane than the surface of the open end of the inner casing and spaced from the inner casing. A second glass washer was positioned within the upper casing position against the opposite surface of its flange. The two glass washers were each provided by a glass washer of Kimble Glass No. N-51A, which is sodium, halogen and sulfur resistant. The assembly was then heated in an argon atmosphere at a temperature of 1250°C whereby the two glass washers provided two partially abutting glass seals, one of which seals together the adjacent flanges of the upper portion of the outer metallic casing and of the cap portion of the metallic closure and seals the flanges to the outer wall of the inner casing adjacent to but spaced from its open end. The second glass washer seals together the opposite surface of the flange of the upper portion of the outer metallic casing, and a portion of the outer wall of the inner casing. The upper and lower portions of the outer casing were then joined together at their second open ends by welding to complete the outer casing. A cap insert is positioned within the cap portion thereby closing the open end of the inner casing. The cap insert had an electrical lead welded to its exterior surface and had an electronic conductor welded at one end to its interior surface whereby the electronic conductor is positioned within the interior surface of the inner casing. The conductor was a closed wire hairpin with a wire spiral affixed to its opposite end whereby the spiral contacted the interior surface of the closed end of the inner casing when positioned within the inner casing. The tantalum cap insert was welded to the cap portion. A removable closure was positioned in the opposite end of the outer casing. The closure had an electrical lead welded to its exterior surface and a reactant opening in the closure. In this manner, fifty battery casings were formed in accordance with my invention.

While other modifications of the invention and variations thereof which may be employed within the scope of the invention have not been described, the invention is intended to include such as may be employed within the following claims:

What I claim as new and desire to secure by Letters Patent of the United States is:

1. A battery casing comprising an inner casing of a solid sodium ion-conductive material with one open end, an outer metallic casing comprising an upper portion and a lower portion, the upper portion with opposite open ends, an inwardly extending flange affixed to the upper portion at its first open end, the lower portion with opposite open ends, a removable closure for its first open end, and an opening in the removable closed end, the upper and lower portions joined together at their associated second open ends, the outer metallic casing surrounding the inner casing with the exterior surface of the flange on a lower plane than the surface of the open end of the inner casing and spaced from the inner casing, a metallic closure consisting of a cap portion with a flange and a cap insert, the flange of the cap portion positioned adjacent the flange of the upper portion of the outer metallic casing, a first glass seal sealing together the adjacent flanges of the upper portion of the outer metallic casing and of the cap portion of the metallic closure and sealing the adjacent flanges to the outer wall of the inner casing adjacent its open end, a second glass seal sealing together the opposite surface of the flange of the upper portion of the outer metallic casing and a portion of the outer wall of the inner casing, the cap insert adapted to be positioned within the cap portion thereby closing the open end of the inner casing, and an electronic conductor affixed to the interior surface of the cap insert adapted to be positioned within the interior surface of the inner casing, the electronic conductor in the form of a closed wire hairpin, and a wire spiral affixed to one end of the wire hairpin and in contact with interior surface of the closed end of the inner casing.

* * * * *